Oct. 8, 1968  A. H. ROBERTS  3,405,026
IMPACT RESISTANT ARTICLE AND METHOD OF MANUFACTURE
Filed May 14, 1965

INVENTORS
ARTHUR H. ROBERTS
BY

ATTORNEYS

United States Patent Office 3,405,026
Patented Oct. 8, 1968

3,405,026
IMPACT RESISTANT ARTICLE AND METHOD OF MANUFACTURE
Arthur H. Roberts, Brooklyn, N.Y.
(12 Lynnwood Drive, Westbury, N.Y. 11590)
Continuation-in-part of application Ser. No. 22,002, Apr. 13, 1960. This application May 14, 1965, Ser. No. 455,764
17 Claims. (Cl. 161—7)

ABSTRACT OF THE DISCLOSURE

This invention relates to composite decorative articles of manufacture and their preparation. The articles are fracture-resistant, three-dimensional, hollow and rigid. They comprise of two essential elements: (1) a pliable outer premolded plastic skin and (2) a rigid plastic structural backing member solidified behind the skin and forming a joint cavity with the latter. The joint cavity may be filled with the foam of a rigid plastic. Illustrative for the skin materials are plastisol, polyethylene and rubber. Illustrative for the rigidifier are plaster of paris, asphalt and a colloidal combination of asphalt, rubber and polyethylene. A preferred skin is molded from plastisol by slush-casting or rotational casting using a seamless mold. The plastisol is gelled, fused and removed from the mold. The rigid structural backing member can be molded in the premolded skin and in many cases without the assistance of a supporting second mold. By the favored method decorative articles with complicated undercuts can be prepared in a simple and economic manner.

This is a continuation-in-part of my copending patent application Ser. No. 22,002, filed Apr. 13, 1960, now abandoned, for "Method and Means for Manufacturing Various Articles and Articles Produced Thereby."

This invention relates to novel, rigid, impact resistant manufactured articles and to methods and means of their manufacture. The articles are of varying sizes, may have more or less intricate shapes and may have "undercuts." Similar articles in the prior art were made predominantly of ceramic or plaster materials. These prior art articles of manufacture have the disadvantages that they are extremely fragile, chip easily and have extremely low impact strength. To these disadvantages must also be added the disadvantage that they are uneconomical in that much hand finishing is required on the seam lines caused by the mold seams.

Alternatively, prior art has also utilized various casting processes for manufacturing seamless hollow articles out of plastisol and the like. The resulting product is quite attractive and can be decorated as easily as plaster, and in fact more easily than ceramics. The plastisol article so cast will not chip and is almost unbreakable. Also, if the die is seamless, a seamless product can be obtained. The use of plastisol, however, is very uneconomical since the material is expensive. Also, plastisol has a defect called "cold flow," which brings about a warpage at subtropical temperatures or in the vicinity of household radiators. Besides these defects, it has reduced impact strength at low temperatures.

Therefore, prior art manufacturers of such articles as lamp bases have had the choice of producing ceramic and plaster articles which are inexpensive but very fragile, or producing plastisol articles which have good impact and chip resistance at normal temperatures, but which are uneconomical, have "cold flow" and poor impact strength at low temperatures. The phenomenon of "cold flow" has also been called "heat distortion."

An object of this invention is to provide manufactured articles with improved properties and without the disadvantages of the prior art articles.

A further object is to provide a process for producing small and large seamless hollow objects of plastic with improved resistance to cold flow, chipping and breakage, and which is economically competitive with prior art processes and their products.

Other objects of this invention will become apparent from the description of this invention further below.

The manufactured articles of this invention are composed of an outer layer referred to as the skin and an inner layer which is called the rigidifier or the rigid structural backing member.

The skin is preset in its shape by a molding operation. It is formed from a plastic material which is pliable and resilient. The outer surface of the skin readily receives coloring materials for decorating the composite article. The inner walls of the skin define an internal cavity accessible through an opening in the skin. The rigidifier or rigid structural backing member is in intimate contact with the inner walls of the preset skin and is in supporting relationship to the outer skin. The rigidifier rigidly maintains the outer skin in its preset shape. The rigidifier is preferably applied in liquid state and solidifies within the preset skin. Depending on the skin and rigidifier utilized, the skin may act as a mold to form the rigidifier layer, or the setting of the latter may be performed while the skin is in a second mold or die. This second mold or die would usually be a split mold and is used to prevent deformation of the skin during the casting of the rigid structural backing member.

The invention will appear more clearly from the following detailed description when taken in connection with the accompanying drawings showing, by way of example, generally illustrative embodiments of the invention.

Figure 1:
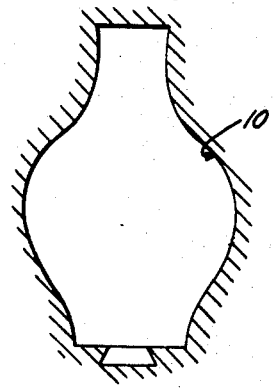
FIG. 1 is a vertical cross-sectional view of an undercut die utilized in the present invention.

The outer layer or skin portion 12 of the composite article of manufacture 11 of this invention (see FIG. 2) has a preferred wall thickness of from about $\frac{1}{64}$ inch to about $\frac{1}{4}$ inch. (Expressed in thousands of inches, this corresponds to a range of from about 15.625 mils to about 250 mils.)

Whereas the rigidifier 13 may have a thickness equal to the thickness of the skin or even somewhat less, in most cases the thickness of the rigidifier is substantially greater than that of the skin. Comparative thicknesses vary with the skin and rigidifier utilized. For instance: a comparatively more rigid pliable skin may permit the application of a thinner layer of rigidifier, than a more flexible type, while maintaining the rigidifier at the same composition. By varying the composition, a tougher rigidifier would permit the use of a thinner layer, than would a less tough rigidifier, while maintaining the skin constant.

In one of the embodiments of this invention (FIG. 3) the outer skin and inner rigidifier or rigid backing member jointly form a second cavity and a reinforcing spine may be applied as a third component, assisting the rigidifying action of the rigidifier and toughening the composite article of manufacture.

Plastisols illustrate an eminently suitable material to form the skin portion of the articles of manufacture of this invention. Plastisols are well described in the literature, as e.g., in Modern Plastics 26, 78 (April 1949) by Perrone and Neuwirth. They are dispersions of finely divided polyvinyl resin powders in liquid organic plasticizers. The resins contain predominantly polyvinyl chloride with or without some other polymerized monomer. They are polymerized to a degree where they have very low solubility at room temperature. Therefore, instead of dissolving them, the plastisols contain the resins in a dispersed state; the dispersions are usually of creamy consistency at room temperature and are always fluid to a certain degree. A great variety of plasticizers can be used. Dioctyl phthalate is an example. Dioctyl adipate is another example, which frequently is used in admixture with dioctyl phthalate. Polyester plasticizers are also well known. The plastisols usually contain a stabilizer and may contain pigment, if so desired. For convenience and to achieve brevity, a few publications may be referred to, which all deal with plastisols, their formulation and application methods: (a) Geon Resin 121 in Plastisol Compounding. Service Bulletin PR–4, revised October 1958, B. F. Goodrich Chemical Company, 24 pages; (b) The Vanderbilt News, vol. 26, No. 3, June 1960, R. T. Vanderbilt Company, Inc., page 12; (c) Modern Plastics Encyclopedia, issue for 1961, published in September 1960, Vinyl Polymers and Copolymers, pages 129 to 132, Plastisol Molding, pages 765 to 771; (d) Modern Plastics Encyclopedia 1965 (issued 1964), Vinyl Polymers and Copolymers, page 271, Plastisol Molding, page 690.

When molding plastisols, the material is heated to a gelling temperature and a gelled film or layer is formed which is very weak and cheesy, but which does not flow. Further heating is required to "fuse" the deposit, causing the resin to dissolve in the plasticizer and form a tough homogeneous resinous mass in which the powdered resin and liquid plasticizer have formed a single uniform phase. The fusion transforms the cheesy deposit or film to a tough leather-like homogeneous layer or skin.

With regard to temperatures required, these are well known in the art. They vary from composition to composition. They vary with time. There are, further, three types of temperatures involved: (1) oven temperature, (2) mold (die) temperature and (3) temperature of the plastisol. Gelation temperature may be accomplished by heating the oven from 150° to 600° F. and usually is between a plastisol temperature of 150° to 300° F. The necessary times vary with the temperature used. Fusion is accomplished by heating the gelled layer in ovens from about 350° F. to about 650° F. The achieved plastisol temperature for fusion should advantageously range from about 350° to 450° F.

The most useful molding methods for plastisol skins are illustrated by (a) slush molding, also called slush casting and (b) rotational molding, also called rotational casting. The expression "casting" is used because the plastisols are applied in fluid state and for this reason the operation has similarity to metallurgical casting. Seamless dies are preferred for the intermediate products of this invention. They can be readily utilized, even when complicated undercuts exist in the dies, as the skins produced from the plastisols are flexible, elastic and have a "shape memory," i.e., they recover from their stretched position, obtained during removal, to the original molded shape.

When slush molding or slush casting is used, in the first step an excess of plastisol may be poured into the seamless die. As the plastisol reaches gelation temperature, the layer adjacent the metal wall of the mold gels, i.e., solidifies. The excess plastisol is then removed by pouring off the liquid portion. Heating is then continued to complete the fusion and the molded skin is then removed or stripped from the mold.

The rotational molding is another method of casting. The basic departure from the slush molding is that, instead of an excess of the liquid plastisol, a premeasured quantity of the fluid is used when charging the die. This eliminates the need for removing any excess. The charged fluid plastisol is then distributed evenly in the die by rotating the same, as on a rotational molding machine. After the plastisol is properly distributed, it is gelled by the application of heat and finally fused. The completed skin is then stripped and removed from the die.

Whereas the casting by slush molding or rotational molding is preferred to form the skins from plastisols, other methods known in the art may also be followed to achieve the same purpose.

The application of the rigidifier flesh portion occurs in a liquid state. The flesh material is liquid, poured into and distributed over the internal wall of the molded skin. Depending on the material used for the skin, its wall thickness, the temperature at which the liquid rigidifier is applied, the molded and stripped skin may be used as such to apply to it the liquid rigidifier, or the skin may be transferred to a two-piece second die for the application of the rigidifier. If, for instance, the rigidifier is plaster of paris, which is applied in admixture with water at room temperature, and the skin is formed from a not too soft plastisol, the molded skin itself may be strong enough to act as the mold for the rigidifier. If the rigidifier is asphalt, which is applied in molten state, the application of the rigidifier is advantageously carried out in a second two-piece mold to enable the removal of the finished composite article.

Polyolefins, such as polyethylene and polypropylene are other illustrative examples for the production of the skin portion of this invention. The types of polyethylene most suitable for this invention are pliable, flexible and show some degree of elasticity. Polyethylene is preferred in this invention over polypropylene since it is more easily formed into pliable and flexible skins. Polyethylene copolymers, such as ethylene-vinylacetate and ethylene-ethyl acrylate copolymers, offer improved flexibility and resilience. They are rubberlike and similar to elastomeric plastics. For the production of skins from polyethylene and polypropylene, seamless dies are not satisfactory and two piece dies are preferred, using blow molding or other methods.

The skin portion of the articles of manufacture of this invention may be formed of other materials such as vulcanized natural rubber or synthetic rubber. The skins may be formed according to known procedures of rubber technology. One of the methods useful in preparing skins from rubber is to use latex molding (latex casting) compounds, utilizing plaster of paris molds. The Vanderbilt News, vol. 27, No. 4, December 1961, page 72, deals with latex compounding which can be used to make skins for articles according to the present invention.

Objects made of plastisols frequently display the defect known as cold flow. Cold flow may be defined as the warpage or bow of material caused by its normal environmental temperature. Cold flow in plastics is analogous to the warping of a wax candle in a hot climate, and when a thermoplastic product is subjected to compression, tension or flexing, the cold flow characteristics become even more accentuated. When a condition of localized intensified heat, such as that to which lamp bases are often subjected, is superimposed on a stressed article, cold flow warpage becomes critical and often results in making further use of the article impossible. The application of a rigidifier in accordance with the present invention eliminates the cold flow characteristics of plastisol skins, or at least reduces them to commercially acceptable limits.

Asphalt and plaster of paris are illustrative examples of the rigidifier flesh portion. Asphalt illustrates the alternative, where a unitary product is obtained, particularly in view of the good adhesion properties of asphalts to the skin materials of this invention. In the case of plaster of paris, the skin fits like a glove and, according to experience, stays snugly in place without the use of an adhesive. Asphalt is applied in molten liquid state and it solidifies by cooling. Plaster of paris, also known as gypsum, is applied in admixture with water as a liquid and solidifies by a cold setting mechanism. Both of these rigidifiers give structural rigidity to the flexible skins and improve cold flow resistance. The composite article is resistant to breakage, as the skin provides excellent impact resistance which is improved by its relationship with the rigidifier and, at the same time, strengthens the rigidifier and protects it from fracture. Another material suitable as rigidifier flesh portion is a colloidal combination of asphalt, rubber and polyethylene, applied as a stable dispersion.

On asphalts, low grade asphalts may be used in admixture with agents, which reduce its possible cold flow characteristics and which improve the impact strength of the asphalt. In the event the flesh portion is made of plaster of paris or the like, the skin fits like a snug fitting glove or envelope, eliminating the need or adhesion. However, in such cases adhesion may be improved by adding an adhesive to the mixing water of the plaster of paris or by applying an adhesive to the inner surface of the skin portion. Cements, like portland cement which sets with water, may also be applied in a manner similar to plaster of paris, to form the rigidifier layer.

For the application of the rigidifier, which is applied in a fluid state, various methods are suitable, all known in the art. One of the favored methods of application is slush casting or slush molding. Rotational molding can be used also, particularly where large numbers of the same product are manufactured in a given period.

Figure 3:
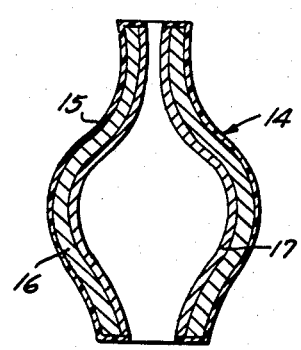
FIG. 3 is a vertical cross-sectional view of a hollow three-dimensional article (such as a lamp base) of the present invention comprising an exterior skin portion, a rigidifier and a further back-up spine portion.
Figure 4:
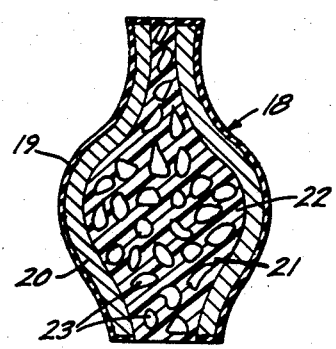
FIG. 4 is a vertical cross-sectional view of a hollow three-dimensional article of manufacture (such as a lamp base) of the present invention comprising an exterior skin portion, a rigidifying layer, and a rigid polyurethane foam portion supporting suspended weights.
Figure 5:
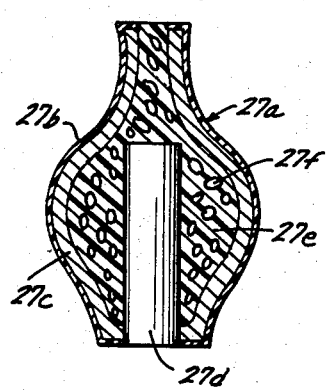
FIG. 5 is another embodiment of the present invention.

In a favored alternative of the products of this invention, the molded skin portion and the rigidifier flesh portion jointly form a second cavity. In this second cavity a reinforcing spine can be advantageously applied, to increase the resistance of the composite article of manufacture to fracture, deformation by cold flow and impact in general. The rigid spine portion can be of various materials. Metals and rigid foams, such as rigid polyurethane foam, may be mentioned for illustrative purposes. Whereas metals are used as layers or strips, the rigid foams are usually used to completely fill the cavity jointly formed by skin and rigidifier. FIGS. 3, 4 and 5 illustrate the application of a reinforcing spine. Where a spine is utilized, the skin protects and retains the rigidifier on the outside and the spine retains it or reinforces it on the inside.

Reference is now made to the drawings.

The seamless die of FIG. 1 yields a shape having an undercut and is suitable for the production of the skin portion of a lamp base. The skin, such as is cast from plastisol, is from about 15.625 mils to about 250 mils ($\frac{1}{64}''$ to $\frac{1}{4}''$) thick. The thinner the plastisol skin, the easier it is removed from the seamless die, especially if the molded shape has a severe undercut. As an example, in the initial step liquid plastisol is cast in a hollow seamless metal die 10, shown in FIG. 1. The plastisol cast in this die is heated with the die 10 in an oven to a temperature and for a period of time sufficient to cause gelation of the plastisol in the layer next to the wall of the metal die. The time and temperature may vary according to plastisol formulation and other factors, as discussed above. The excess plastisol, which is still liquid, is then poured off in the usual slush casting manner. The gelled plastisol layer and the die are heated in an oven having a temperature range of from about 350° to 650° F. to a sufficient temperature and for a sufficient time to fuse the gelled cheesy material to a tough and strong skin. This second heating step provides for dissolution of the vinyl resin in the plasticizer, combining the resin and plasticizer into a single phase. After cooling, the skin may be easily stripped from the seamless die, having an undercut shape, since the skin is flexible and elastic and has a certain degree of stretchability. Preserving its shape memory, the skin will return to its original molded shape. If the skin has a composition to provide rigidity at room temperature, it should be stripped from the die at an elevated temperature, at which it is still flexible and stretchable due to its thermoplastic properties. A temperature of 140° F. has been found quite suitable for this purpose when working with plastisol. Instead of the slush casting method described above, the die of FIG. 1 can be used also on a rotational molding machine for rotational casting, without the necessity of slushing off any excess plastisol.

The skin is next placed in a second die having a shape identical to the first die, but having a seam to permit easy subsequent removal of the article of manufacture, after the rigidifying layer has solidified. With the skin in place in the second die, material having low cold flow characteristics and having satisfactory impact strength at low temperatures is cast behind the skin, or formed there by other suitable methods to form, after rigidification, a structural backing member in supporting relationship to the skin. The rigidifier may be formed of many different materials, e.g., a thermoplastic asphalt, an air setting material like plaster of paris and portland cement, or a colloidal combination (dispersion) of asphalt, rubber and polyethylene which has very low cold flow characteristics and which has satisfactory impact strength at low temperatures. Asphalt is used advantageously in combination with additives, which reduce any tendency to cold flow and increase impact resistance.

The expression "pliable and resilient" as applied to the skin portions is meant in a manner relative to the structural backing member materials. In relationship to each other, the skins are relatively pliable and flexible, whereas the rigidifiers of the composite articles are relatively inflexible and rigid. The composite article as a whole is rigid.

Figure 2:
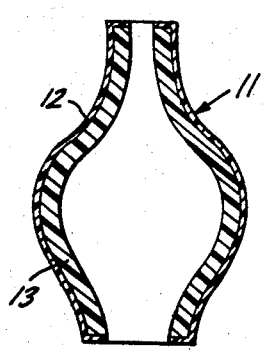
FIG. 2 is a vertical cross-sectional view of a hollow three-dimensional article of manufacture (such as a lamp base) of the present invention comprising an exterior skin portion and rigidifier.

The article illustrated in FIG. 2 comprises a thin resilient and flexible exterior skin portion 12, for example, a high quality plastisol, and rigidifier or structural backing member 13, for example, an inexpensive thermoplastic asphalt. The asphalt can also be replaced by a colloidal combination of asphalt, rubber, and polyethylene and the like, or a non-thermoplastic suitable material, like plaster of paris or cold or hot setting cements. In the case where a room temperature setting rigidifier is used, the second die may be superfluous and casting of the flesh material may be carried out in the preformed skin portion, without any auxiliary die.

In certain larger sized articles, where greater weight is encountered, greater strength may be desirable. To achieve this greater strength, a spine portion may be cast or placed behind the back-up rigidifying flesh portion. FIG. 3 illustrates such a reinforcing spine.

FIG. 3 is a vertical cross-sectional view of an article 14 comprising a skin portion 15 of plastisol derived plasticized polyvinyl chloride, a structural backing member 16 of plaster of paris and a metal spine portion 17. The spine portion may be of metal (or other rigid high strength material) which has a melting point in a range of 250° F. to 700° F. Since different grades of asphalt melt and flow at different temperatures from about 180° F. to about 500° F., it is preferable to use metals having a melting point of from about 450° to 500° F. for the spine, particularly if asphalts are used for the flesh portion 16. Generally metals melting at lower than 450° F. are too costly to use. It has been found that metals having melting points as high as 700° F. will cast well behind asphalt layers having a melting point of 450° F. because of the quick chilling effect of the cold asphalt on the molten metal. After the composite article is chilled, a rigid article results. Rapid chilling may be achieved by immersion in a non-combustible coolant having a high boiling point. Such a coolant is illustrated by a mixture of 67% by weight of glycerine and 33% of water, by weight, which boils above 500° F. and freezes below −50° F., and has no flash point. Such chilled rigid articles may then be easily removed from the second die, if such is used, and still will have no exterior seams.

The vertical cross-sectional view of article 18 of this invention is shown in FIG. 4. The composite article 18 comprises a skin portion 19 of rubber, a rigidifying portion 20 of plaster of paris, and a cavity 21 filled with a rigid polyurethane foam 22, or the like, with inexpensive "fill" 23 suspended therein to reduce the quantity of the polyurethane foam composition required and, if desired, to give added weight. The "fill" 23 may be scrap wood pieces, scrap rigid foam products, natural diatomaceous earth, reject ping pong balls, vermiculite, etc. The polyurethane foam 22 also helps to prevent cold flow and provides additional strength. By loading inexpensive rigid scrap pieces of "fill" into the hollow cavity behind the flesh, a reduction of as much as 75% to 80% in the quantity of the foam required can be achieved.

FIG. 5 is a vetrical cross-sectional view of a hollow three-dimensional article of manufacture (such as a lamp base) of the present invention comprising an exterior skin portion, a back-up rigidifier, a rigid paper or metal tube and polyurethane foam supporting suspended "fill." In FIG. 5 the tube as well as the rigid polyurethane foam are spines. The numerals designate the following: the article 27a, skin portion 27b, rigidifier 27c, tube 27d, polyurethane foam 27e, and "fill" 27f. Obviously, the greater the volume of the tube 27d, the smaller the amount of expensive polyurethane foam 27e required.

Figure 6:
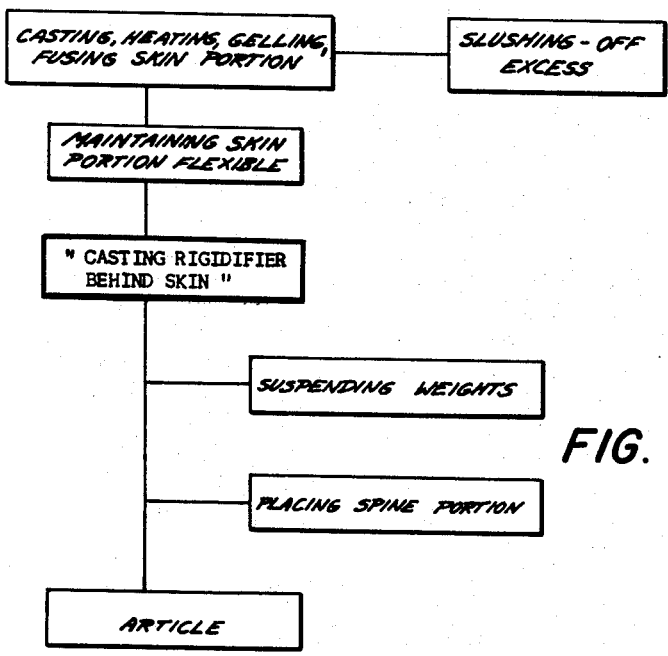
FIG. 6 is a flow diagram of a process of the present invention.

An illustrative flow diagram of one of the suitable processes of this invention is shown in FIG. 6, as follows:

Step 1.—Casting fluid plastisol in a seamless die. Alternative (a): by slush casting. Alternative (b): by rotational casting (molding).

Step 2.—Heating the plastisol to a sufficient temperature and for a sufficient time to cause gelation of the plastisol adjacent to the die. In alternative (a) pouring off the excess liquid plastisol.

Step 3.—Heating the die and gelled plastisol to a temperature and for a time sufficient to fuse the gelled plastisol to a tough skin.

Step 4.—Stripping the skin from the die.

Step 5.—Slush casting a rigidifying flesh material in liquid state behind the skin. Alternative (a): after first placing the skin into a two-piece second die, having the same shape as the first die. Alternative (b): using the molded skin as a mold to form the flesh portion behind it.

Step 6.—(Elective alternative): casting a reinforcing spine in the jointly formed cavity of the skin and flesh materials;

Step 7.—Recovering the composite article of manufacture so formed.

In rotational molding no excess of plastisol has to be poured off. Gelation temperatures may vary, depending on composition of plastisol, duration of heat and whether temperature of oven or of die or of plastisol is taken. Gelation can be achieved satisfactorily at plastisol temperatures of 150° to 350° F. or at oven temperatures of 150° to 600° F., providing duration is properly adjusted. Fusion can be achieved between 350° and 650° F., depending on other factors, such as duration. Normally, plastisol temperatures of 350° to 450° F. yield satisfactory results. As flesh materials, asphalt and plaster of paris, for example, may be used. Examples for spine are metal and solid polyurethane foam.

Among the advantages of the present invention are that the resulting articles have a high impact and chip strength; do not have cold flow characteristics; are inexpensive to manufacture; and may be quite readily mass-produced by the process of the present invention.

It is apparent that the described examples are capable of many variations and modifications within the scope of the present invention. All such variations and modifications are to be included within the scope of the present invention.

What I claim is:

1. A composite, rigid fracture-resistant hollow three-dimensional decorative article of manufacture comprising a pliable outer molded skin of a preset shape formed of a resilient plastic material and having an outer surface for receiving coloring materials for decorating said article and inner walls, said outer skin having an opening formed therein, said skin enclosing an internal cavity defined by said inner walls accessible through said opening, and a rigid structural backing member formed from a plastic material within said internal cavity and in intimate contact with said inner walls and engaged with the entire extent thereof, said structural backing member being in supporting relationship to said outer skin and rigidly maintaining said outer skin in its preset shape, said structural backing member defining a second internal cavity within said article.

2. The composite, rigid, fracture-resistant hollow three-dimensional molded decorative article of manufacture of claim 1, wherein the molded outer skin has a wall thickness of from about 15 mils to about 250 mils and is a member of the class consisting of (a) plastisol, (b) polyethylene and (c) rubber, and said rigid structural backing member supporting said skin is a member of the class consisting of (i) plaster of paris and (ii) an asphalt.

3. A composite, rigid fracture-resistant hollow three-dimensional decorative article of manufacture comprising a pliable outer molded skin of preset shape formed of a resilient plastic material and having an outer surface for receiving coloring materials for decorating said article and inner walls, said outer skin being of a thickness from about 15 mils to about 250 mils, said outer skin having an opening formed therein, said skin enclosing an internal cavity defined by said inner walls accessible through said opening, and a rigid structural backing member formed from a plastic material within said internal cavity and in intimate contact with said inner walls and engaged with the entire extent thereof, said structural backing member being in supporting relationship to said outer skin and rigidly maintaining said outer skin in its preset shape, said structural backing member defining a second internal cavity within said article.

4. A composite, fracture-resistant hollow three-dimensional decorative article of manufacture in accordance with claim 3 wherein said outer skin comprises vinyl chloride in a polymerized and plasticized state.

5. A composite, rigid fracture-resistant three-dimensional decorative article of manufacture comprising a pliable outer molded skin of a preset shape formed of a resilient thermoplastic material and having an outer surface for receiving coloring materials for decorating said article and inner walls, said outer skin having an opening formed therein, said skin enclosing an internal cavity defined by said inner walls accessible through said opening, a rigid structural backing member formed from a plastic material within said internal cavity and in intimate contact with said inner walls and engaged with the entire extent thereof, said structural backing member being in supporting relationship to said outer skin and rigidly maintaining said outer skin in its preset shape, said structrual backing member forming a second internal cavity, and a rigid foam filler formed within and filling said second cavity.

6. The composite, rigid, fracture-resistant three-dimensional molded decorative article of claim 5, wherein the outer molded skin has a wall thickness of from about 15 mils to about 250 mils and is formed of plastisol, said rigid backing member consisting of plaster of paris and said foam filler being a rigid polyurethane foam.

7. A composite, rigid fracture-resistant three-dimensional decorative article of manufacture comprising a pliable outer molded skin of a preset shape formed of a resilient thermoplastic material and having an outer surface for receiving coloring materials for decorating said article and inner walls, said outer skin having an opening formed therein, said skin enclosing an internal cavity defined by said inner walls accessible through said opening, a rigid structural backing member of a thickness substantially greater than the thickness of said outer skin formed from a plastic material within said internal cavity and in intimate contact with said inner walls and engaged with the entire extent thereof, said structural backing member being in supporting relationship to said outer skin and rigidly maintaining said outer skin in its preset shape, said structural backing member forming a second internal cavity, and a rigid foam filler formed within and filling said second cavity.

8. A composite, rigid fracture-resistant hollow three-dimensional decorative article of manufacture comprising a pliable outer molded plastisol skin of a preset shape having an outer surface for receiving coloring materials to decorate said article and an inner surface defining an internal cavity, said outer skin having an opening therein providing access to said cavity, and a rigid structural backing member formed from a plastic material within said internal cavity in intimate contact with said inner surface along the entire extent thereof, said rigid structural backing member supporting said skin and rigidly maintaining the same in its preset molded shape, said outer skin constituting a pliable external zone of said composite article supported by said structural backing member, said structural backing member defining a second internal cavity within said article.

9. The composite, rigid, fracture-resilient three-dimensional molded decorative article of manufacture of claim 8, wherein the molded outer plastisol skin has a wall thickness of from about 15 mils to about 250 mils and said rigid structural backing member supporting said skin is plaster of paris.

10. The composite, rigid, fracture-resistant three-dimensional molded decorative article of manufacture of claim 8, wherein the molded outer plastisol skin has a wall thickness of from about 15 mils to about 250 mils and said rigid structural backing member supporting said skin is asphalt.

11. A rigid hollow decorative article of manufacture, comprising a thin, relatively flexible plastisol skin portion, a relatively rigid asphalt flesh portion fused to and within said skin portion in supporting relation thereto, and a rigid metal spine portion contiguous to and within said flesh portion to form a rigid article, said flesh and spine portion substantially following the outline of the shape of the skin portion.

12. A method for forming a rigid three-dimensional fracture-resistant hollow composite decorative article of manufacture comprising the steps of casting a liquid plastisol material in a hollow seamless mold, heating the cast layer of plastisol to gel the layer of plastisol next to the mold, heating the gelled layer of plastisol, while in the mold, to a temperature sufficient to fuse the gelled plastisol and to form an outer plastisol skin having a preset shape defined by the shape of the mold and having an internal cavity with an access opening to said internal cavity, removing said skin from said mold, slush-casting a solidifiable liquid plastic material, capable of being transformed into a rigid solid, into the internal cavity of the preset outer skin portion in a manner to form a second internal cavity, solidifying the said liquid material, capable of being transformed into a rigid solid, to a rigid backing member in intimate contact with the entire inner surface of said skin, and recovering the molded composite decorative article.

13. A method for forming a rigid three-dimensional fracture-resistant composite hollow decorative article of manufacture comprising the steps of casting a sufficient amount of liquid plastisol material in a hollow seamless mold to form a cast layer from about 15 mils to about 250 mils in thickness, heating the cast layer of plastisol to gel the layer of plastisol next to the mold, heating the gelled layer of plastisol, while in the mold, to a temperature sufficient to fuse the gelled plastisol and to form an outer plastisol skin having a preset shape defined by the shape of the mold and having an internal cavity with an access opening to said internal cavity, removing said skin from said mold, slush-casting a solidifiable liquid plastic material, capable of being transformed into a rigid solid, into the internal cavity of the preset outer skin portion in a manner to form a second internal cavity, solidifying the said liquid material to a rigid backing member in intimate contact with the entire inner surface of said skin, and recovering the molded composite article.

14. The method of claim 13, wherein the slush-cast solidifiable liquid material is a member of the class consisting of (i) plaster of paris and (ii) an asphalt.

15. The method of claim 13, including the step of casting a metal reinforcing spine within said second cavity in intimate contact with said backing member.

16. The method of claim 13, including the step of filling said second cavity with a rigid polyurethane foam material in intimate contact wtih the internal surfaces of said rigid backing, said rigid polyurethane foam material having the characteristic of being in itself deformable on impact.

17. A process for forming rigid hollow composite decorative articles of manufacture comprising the steps of molding a flexible shell from a plastic material, said shell having the external shape of the composite article and having internal walls defining an internal cavity, forming an access opening in said shell in communication with said internal cavity, inserting a solidifiable liquid plastic material into said cavity, said liquid plastic material being capable of being transformed into a rigid solid, applying said solidifiable liquid material by slush-casting to the interior surface of said shell, forming a rigid hollow structural backing member for said shell by solidifying said liquid material against the entirety of said interior surface, and recovering the composite article.

References Cited

UNITED STATES PATENTS

| | | | |
|---|---|---|---|
| 2,588,571 | 3/1952 | Porter | 264—302 |
| 2,629,134 | 2/1953 | Molitor | 264—310 |
| 2,843,646 | 7/1958 | Conant | 264—262 |
| 2,944,821 | 7/1960 | Mason | 264—311 |
| 2,974,373 | 3/1961 | Streed et al. | |
| 2,277,752 | 3/1942 | Frey | 161—6 |
| 2,794,756 | 6/1957 | Leverenz. | |
| 2,880,467 | 4/1959 | Wibbens | 264—302 |
| 2,918,703 | 12/1959 | Beal | 264—310 |
| 3,071,817 | 1/1963 | LaPorte | 264—302 |
| 1,878,086 | 9/1932 | Woodall et al. | 161—237 XR |
| 2,065,316 | 12/1936 | Kimsel | 156—59 |
| 2,731,375 | 1/1956 | Toulmin | 161—224 XR |
| 2,797,179 | 6/1957 | Reynolds | 161—231 XR |
| 2,802,766 | 8/1957 | Leverenz | 161 |
| 3,042,137 | 7/1962 | Mathues et al. | |
| 3,138,380 | 6/1964 | Satchell et al. | 273—82 |

FOREIGN PATENTS

| | | |
|---|---|---|
| 218,027 | 10/1958 | Australia. |
| 670,275 | 3/1949 | Great Britain. |
| 557,617 | 11/1959 | Canada. |
| 702,146 | 1/1954 | Great Britain. |

ROBERT F. BURNETT, *Primary Examiner.*

W. A. POWELL, *Assistant Examiner.*